March 23, 1965 W. K. JEKAT 3,174,352
GEAR CONNECTION FOR ROTARY SHAFTS
Filed Sept. 21, 1962 3 Sheets-Sheet 1

WALTER K. JEKAT
INVENTOR.
BY Daniel A. Bolis
Atty

WALTER K. JEKAT
INVENTOR.

March 23, 1965 W. K. JEKAT 3,174,352
GEAR CONNECTION FOR ROTARY SHAFTS
Filed Sept. 21, 1962 3 Sheets-Sheet 3

WALTER K. JEKAT
INVENTOR.
BY

United States Patent Office 3,174,352
Patented Mar. 23, 1965

3,174,352
GEAR CONNECTION FOR ROTARY SHAFTS
Walter K. Jekat, Upper Montclair, N.J., assignor to Worthington Corporation, Harrison, N.J., a corporation of Delaware
Filed Sept. 21, 1962, Ser. No. 225,180
7 Claims. (Cl. 74—410)

This invention relates to a high speed rotatable coupling. It relates more particularly to a means for closely coupled axially aligned shafts.

The coupling is especially adapted to connect a prime mover with a variety of components such as compressors, turbines and pumps to which rotation is transmitted. For the purpose of disclosing the invention however, the following description will be drawn to the combination in which an electric motor drives a high speed centrifugal gas compressor.

To achieve a greater gas compression in any centrifugal compressor, it is known to increase the diameter of the impeller or alternatively to drive the impeller at a greater speed. The primary purpose is to achieve a higher degree of compression with no substantial increase in the size of the unit. In the instance of single-stage centrifugal compressors, the optimum goal is to increase the speed of the unit and thus limit the impeller diameter to a reasonable size.

The prior art teaches that for motor driven centrifugal compressors, coupling is normally effected through a direct connection of the respective motor and compressor shafts. In other means, and in order to increase compressor speed, a gear box or other similar gearing means may be used. The use of such gear units understandably tends to add to the space requirement of the compressor motor unit and also adds to the cost.

A regularly occurring problem to the detriment of motor driven units is misalignment of coupled component parts. Misalignment not only occurs at the initial setting up and assembly of a machine, but also occurs through usage, temperature variations, and excessive vibration especially at heavy loads and high speeds. It has been found that when a compressor of the type in issue is driven at a very high rate of speed, the propensity to be shaken out of alignment is disproportionately greater than experienced at lower speeds.

It has been suggested in the prior art that as a corrective measure misalignment of flexibly coupled parts may be overcome by modifying the prescribed contour of meshed gear teeth through provision of crowned or barreled tooth surfaces. In the instance of an epicyclic coupling however the nature of mating involute teeth is such that for high speed operation it is not advisable to so alter the normal meshing relationship of gear teeth.

In the presently disclosed arrangement, there is provided a gear coupling with modified gear teeth for connecting components in which intermeshed involute gear teeth on the central, immediate and ring gears are maintained in proper engagement at all times. This engagement is achieved by modifying at least one of the central or ring gears in such manner that said members are provided with axially slidable and angularly rotatable surfaces on non-meshing but rotatably engaged portions.

It is therefore a primary object of the invention to provide a high speed coupling for in-line motor driven units.

It is a further object to provide a coupling of the type described in which the respective shafts of the motor and driven unit are disposed and coupled to provide a degree of flexibility to permit power transmission in spite of misalignment.

A still further object is to provide a motor driven centrifugal compressor unit disposed in a coaxial arrangement, the respective driven and drive units being closely spaced and connected by a flexible torque transmitting coupling extending therebetween.

Further objectives of the invention not presently mentioned will become clear to those skilled in the art from the following description in which.

Figure 1:
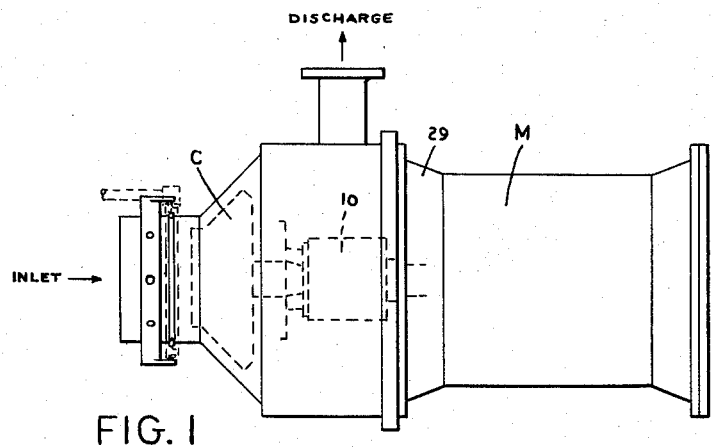
FIGURE 1 illustrates a combination motor compressor unit of the type presently contemplated connected by a flexible coupling.

In brief, and with reference to FIGURE 1, the invention is illustrated in conjunction with a compact high speed combination compressor-motor unit including centrifugal gas compressor C, and a coaxially positioned driving motor M connected through a gear coupling assembly 10. The compressor includes essentially a single-stage housing having a center opening which terminates in the peripheral constricted annular chamber for receiving compressed gas. An impeller is supported in the housing for high speed rotation therein. An elongated rotatable shaft carried on the impeller is supportably journaled in the housing, extends rearwardly in a direction toward the motor drive shaft, and is connected thereto by a flexible coupling.

Figure 3:
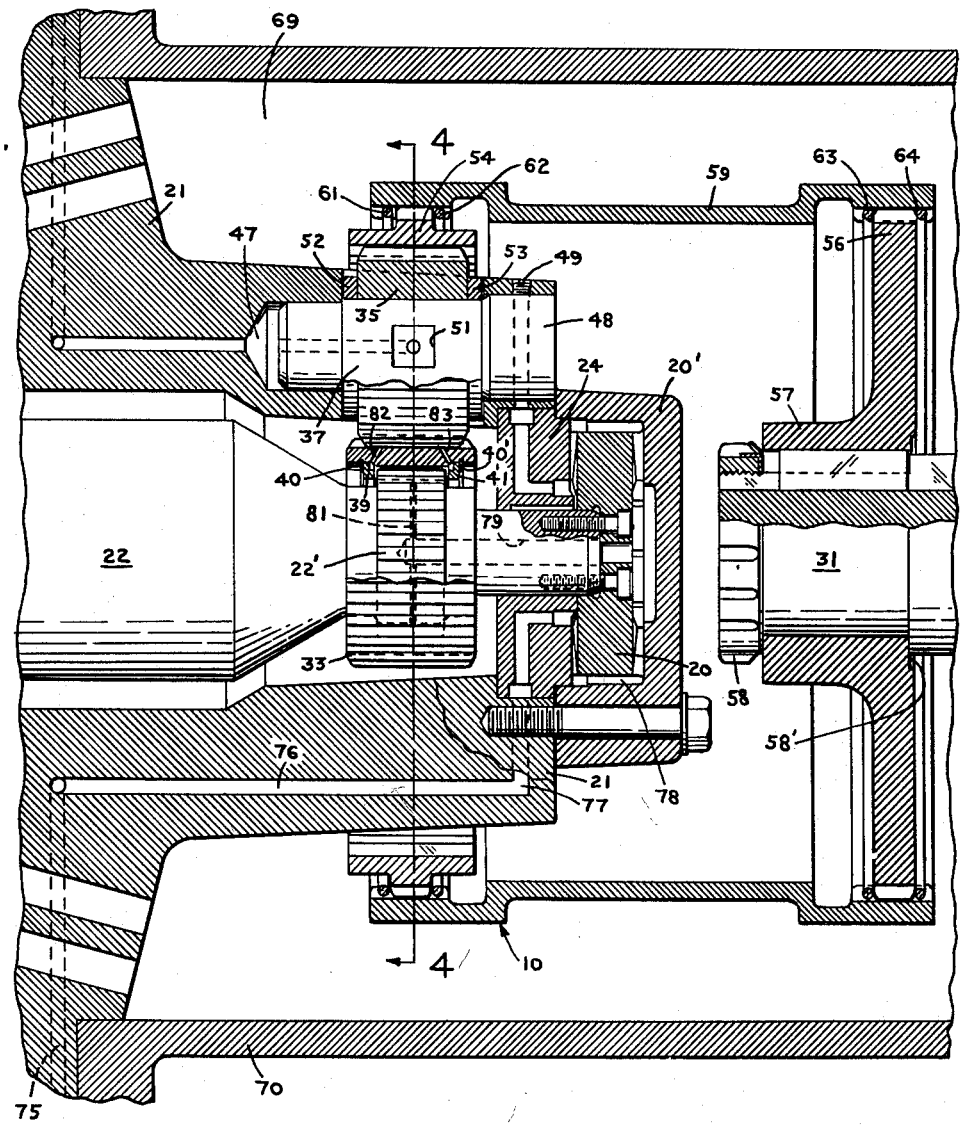
FIGURE 3 is a cross-sectional view on an enlarged scale of a portion of the compressor and the coupling shown in FIGURE 2.

In one embodiment of the novel coupling assembly and as shown in enlarged FIGURE 3, a central gear is splined to the compressor shaft. Intermediate gears rotatably supported on the compressor housing are in coplanar relationship with the central gear and meshed therewith. A ring gear surrounds the respective intermediate gears and is in meshed engagement with same. At least one member of the central and ring gears is adapted to afford a degree of flexibility to the coupling whereby misalignment of normally coaxially disposed shafts will permit transmission of torque from the motor to the compressor without excessive wear of mating gears and coupling elements. This is provided by modifying the central, ring, or both of said gears to provide a longitudinal, slidable and rotatable fit in engaged teeth other than those in meshed engagement.

An elongated generally cylindrical torque transmitting coupling member is loosely fastened to a coupling hub on end of the motor drive shaft. The other end of said member is adapted to loosely engage the modified ring gear whereby motor speed is stepped up for transmitting torque to the compressor.

Figure 2:
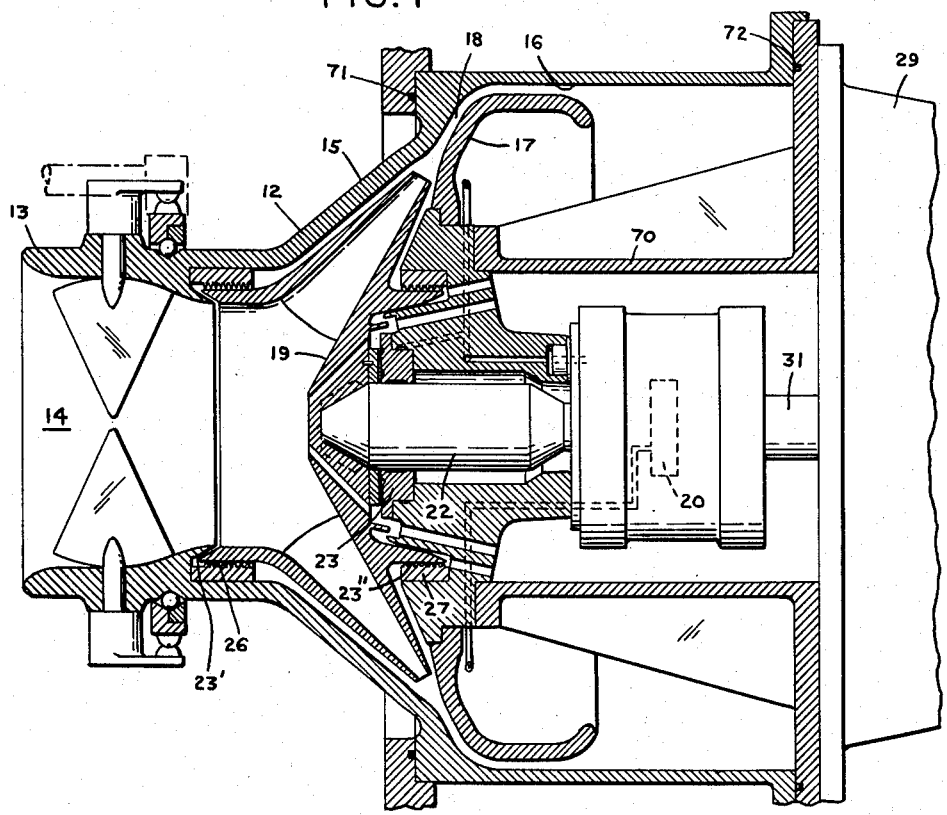
FIGURE 2 is an enlarged view in partial cross section of the compressor and coupling shown in FIGURE 1.

Referring to the drawings, FIGURES 1 and 2 illustrate a centrifugal compressor C of the type presently contemplated. The compressor design itself is basically of a type familiar in commercial use having a rearwardly extending drive shaft. It should be mentioned that the coupling as presently described is adapted for use with other types of centrifugal compressors not specifically mentioned, although the following description is directed to the embodiment illustrated.

Compressor C is of the single-stage type and includes in general a housing 12 having at one end an inlet 13 for directing air, a gas or similar fluid to the compressor forward end. Inlet 13 is provided with a plurality of vanes 14 carried on the housing inlet and operable to alter the inlet cross-sectional opening whereby the flow of entering fluid may be varied. A mechanical linkage assembly not shown in detail engages vanes 14 which are actuated either manually or by mechanical means to effect entrance of a desired amount of fluid to the compressor.

As seen in FIGURES 1, 2 and 3, housing 12 includes a peripheral outer wall 15 terminating in annular rim 16. A circular section 17 of the housing spaced inwardly from outer wall 15, defines a constricted chamber 18 to which fluid is carried by centrifugal force after leaving the blade of impeller 19. A rearwardly extending stationary hub or cage 21, disposed substantially coaxial of inlet opening 13 and carried on support member 70 depends from outer casing 29.

Impeller 19 is rotatably journaled within hub 21 having its outer peripheral edge directed toward the constricted chamber 18. Shaft 22 extending axially of the impeller 19 is journaled within the hub 21 by bearings 23 and 24 held at the shaft forward and rear ends respectively. A thrust member 20, positioned at the end of and in abutment with impeller shaft 22, is held in place by cap 20' bolted to the face of hub 21.

Impeller 19 forward open end is provided with an outer sealing surface 23' slidably engaging a circumferential seal ring 26 disposed immediately adjacent casing 13. Similarly, the rear portion of the impeller at surface 30 sealably rotates within the casing 12 and a second circumferential seal 27.

Shaft 22 is fastened to the center of impeller 19 extending axially therefrom, and is of rather heavy construction to induce a flywheel effect to the impeller at relatively high speeds. The rear portion of shaft 22 is adapted to receiving running transmission elements such as gears or the like together with essential journal or anti-friction and/or thrust bearings as will be hereinafter described more fully.

Motor M is preferably hermetically sealed within casing 29. The motor is so positioned as to have drive shaft 31 disposed coaxial of and spaced contiguous with impeller shaft 22. Accurate alignment of these shafts is planned for in the present invention since the high rotational speed at which the impeller runs under normal operating conditions has a decided tendency to throw either the impeller or the compressor out of axial alignment with the driving motor.

Referring to enlarged FIGURE 3, coupling assembly 10, including the gear arrangement, is carried on compressor shaft 22 and motor shaft 31 respectively, transmitting stepped up rotational movement to the impeller. To attain the desired high rotational speed in the present application, it has been found necessary to provide a gearing arrangement through the train such that about a three to one speed ratio is realized between the coupled shafts. This ratio does not infer a limitation to the invention since similarly constructed units have been designed providing a speed increase up to about 8 to 1.

Figures 4, 5, 6, 9:
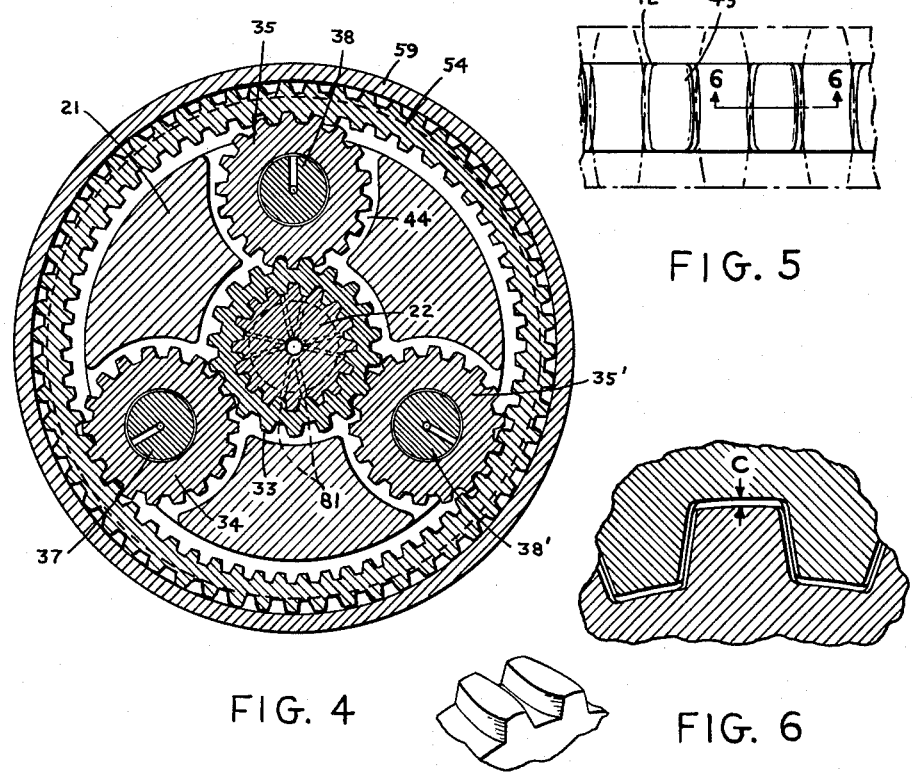
FIGURE 4 is a view in cross section taken along line 4—4 of FIGURE 3.
FIGURE 5 is a view on an enlarged scale showing the non-meshing tooth portions of mating components contemplated by the invention.
FIGURE 6 is an enlarged view in cross section taken along line 6—6 of FIGURE 5.
FIGURE 9 is a perspective view of a gear section showing adjacent crowned surface teeth.

In an embodiment of the invention shown in FIGURES 3 and 4, a rearwardly extending portion of shaft 22 is provided with a raised, splined outer surface 22' onto which central gear 33 is longitudinally, slidably and rotatably received in position. Intermediate gears 34, 35 and 35' of the arrangement are journaled to stub shafts 37, 38 and 38' respectively, which extend parallel of the shaft 22 and are held in place on hub 21. Said intermediate gears and their mounting shafts are equidistant from the center of the shaft 22 and circumferentially equispaced.

The first ring member of central gear 33 is longitudinally, slidably held on shaft 22. Said ring member is preferably a standard form of gear having an axial splined bore adapted to be received on the spline portion 22' of shaft 22. A pair of laterally spaced retainers 39 and 41 abut the forward and rear faces respectively of the spline shaft portion 22' and are laterally held by snap rings 40 and 40' carried in circumferential grooves for longitudinally positioning gear 33 with respect to shaft 22. It is preferred that some longitudinal and radial play exist between shaft 22 and gear 33 to permit self-adjustment of said mating parts in the event of slight misalignment of the motor-compressor unit. The outer periphery of central gear 33 is of normal toothed construction and provided with regularly spaced involute teeth for meshed engagement with intermediate gears 34, 35 and 35'.

Flexibility within the coupling to allow transmission between misaligned drive and driven shafts, is due in part to the sliding relationship between the gear 33 and the splined shaft 22.

Referring to FIGURE 5, a top view of the shaft spline shown in exaggerated proportions indicates that the spline longitudinal faces 42 and 43 are provided with a convex configuration. This in effect defines the spline tooth as being narrower at the ends than at the center. Thus, when mating internal grooves on gear 33 are provided with a similar convex surface, or are constructed relatively flat, there will be at least point to point contact between the two members as shaft 22 is rotated. Such contact thusly assures full rotational transmission regardless of misalignment.

This point-to-point contact relationship understandably causes a rather high localized stress at the point of contact. It is therefore advisable to provide the maximum number of splines that the diameter of the shaft will permit. Also as shown in FIGURE 3, circular retainers 39 and 41 are spaced slightly apart from the spline end faces in order that slight eccentricity of gear 33 on the shaft due to misalignment avoids a binding situation which might otherwise take place.

A side profile of mating non-rotational teeth or grooves is illustrated in FIGURE 6 showing a slight root to crown clearance C between non-meshing tooth sections. The spline may also be provided with a crowned top surface. Thus, when gear 33 operates in eccentric relationship with shaft 22 axis, engaging contact with the shaft is maintained, and proper line to line meshing contact with the intermediate gear teeth is continued at all times.

Referring to FIGURES 3 and 4, hub or cage 21 is generally cylindrical in shape surrounding shaft 22' and having a plurality of transverse slotted openings 44 formed on the outer surface and extending through to the center bore. Each of said slots is sufficiently large and adapted to accommodate a single intermediate gear for rotatably mounting the same.

Intermediate gears 34, 35 and 35' as shown in FIGURE 4, are disposed with centers equispaced both radially and peripherally as to mesh with the outer toothed surface of intermediate gear 33. Said stars are rotatably mounted on the stub shafts such as on 38, extending transversely in each of said slots 44 in a direction extending parallel with impeller shaft 22.

As shown in FIGURE 3, stub shaft inner ends are tightly received in a socket formed in the hub face and provided with intersecting axial and radial passages in communication with lubricant chamber 47 for delivering force fed lubricant to stub shaft outer bearing surfaces.

The intermediate gears are journaled at the center bearing portion of the stub shafts which is provided with a lubricant distributing pocket 51. Floating end spacers such as 52 and 53 carried on shaft 38, positions intermediate gear 35 centrally of the shaft and coplanar with gear 33.

The head portion 48 of each stub shaft as at 37 is closely received in a bore formed in the face of hub 21 and held in place by set screw 49 or other holding means.

Ring member or ring gear 54 is provided with an inner toothed surface which surrounds and is in meshed engagement with respective intermediate gears 34, 35 and 35'. The peripheral surface of gear 54 along a raised center portion about said periphery is formed with a plurality of longitudinally extending slots or grooves similar in configuration to the previously mentioned splines on shaft 22, and adapted to receive torque transmitting member 59. Gear 54 as well as the previously mentioned central gear 33 and respective intermediate gears are fabricated of standard gears made from a hardened steel or like material having a wear resistant contacting surface.

Drive motor shaft 31, as shown in FIGURE 3, extends substantially coaxial of the compressor shaft 22. Shaft 31 carries a disc-like plate 56 having a hub 57 rigidly keyed to said shaft for rotation therewith. A lock ring 58 threaded to the shaft end holds plate 56 in assembled position abutting shoulder 58' on shaft 31. Plate 56 as shown comprises a circular member having an outer diameter approximately equal to the outer diameter of ring gear 54. The outer edge of said plate 56 is provided with longitudinal slots or similar engaging grooves for slidably receiving torque transmitting member 59. For simplicity, and to provide stable rotation, plate 56 may be solidly constructed. Alternatively, though this member may be of web-like construction having radially extending spokes which support a rim so formed and adapted to receive torsion transmitting member 59.

Torsion member 59 comprises a generally tubular shaped body having opposed open ends each of which is adapted at the inner edge to longitudinally, slidably engage the outer edge of ring member 56 and plate 54 respectively. As shown in FIGURE 3, the left hand opening in torsion element 59 is provided with a series of equispaced peripheral splines which engage mating grooves or splines at the outer surface of member 54. These mating grooves are formed in a manner similiar to those previously described with relation to gear 33. Notably, the grooves are provided with convex or barrel shaped contacting faces to permit angular movement with mating teeth during rotation.

Snap rings 61, 62, 63 and 64 or similar fastening rings retained in grooves about the inner surface of member 59 permit a limited degree of axial movement between gear 54, plate 56 and torsion element 59. The nature of the connection established between said members is such that not only may there be relative axial movement but the splines or grooves formed in the mating slidably engaged surfaces are such as to permit a degree of offsetting from a concentric relationship such as will be experienced should the compressor and motor become misaligned. For example, FIGURE 7 illustrates graphically and kinematically the relative disposition of the compressor, motor and torsion member when shafts are in eccentric parallel relationship.

Figures 7, 8:
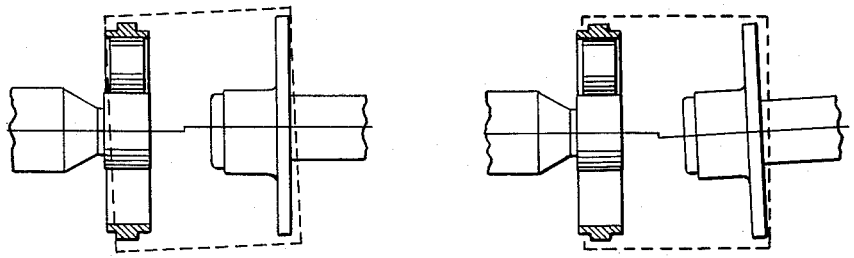
FIGURE 7 is a schematic view illustrating axial misalignment of motor and compressor shafts.
FIGURE 8 is a view similar to FIGURE 7 illustrating misalignment of motor and compressor shafts in non-parallel relationhip.

FIGURE 8 illustrates the condition when the shaft axes are biased out of a parallel relationship. In either instance, flexibility of the outer coupling joints permits point-to-point engagement through torsion member 59 to the respective ring gear 54 and plate 56. In like fashion, gear 33 as shown in FIGURE 3, with its inner spline surface assumes an offset running engagement when shaft 22 is eccentric to the intermediate gear axes.

Normally, when motor shaft 31 is rotated at a relatively high speed, torque developed will be transferred to the gear train through the walls of element 59. The torsion element as shown is normally elongated and cylindrical in shape since its primary function is to traverse the space between the gear train and plate 56. The walls of said member are provided with transverse openings for passing cooling fluid for contacting the transmission elements.

As a further feature of the disclosed arrangement, connecting means such as a passageway may be provided within the compressor unit at some portion of the impeller or in the compressor housing for the purpose of introducing a flow of compressed gas to the coupling area for cooling purposes and to establish a non-corrosive atmosphere thereabout. The coupling is surrounded by the open ended support member 70 preferably of cylindrical configuration and fastened to the motor and compressor housing respectively. A hermetic atmosphere within chamber 69 defined by support member 70 is assured by the presence of flexible O-rings 71 and 72 deformed against the housing and motor casing respectively to provide circumferential seals.

Lubricant may be fed to chamber 69 by any of the several known methods and withdrawn therefrom by a drain placed at the low portion of casing 68. The lubricant may then, in the usual manner, circulate through cooling apparatus exterior to the unit before being reintroduced. Of primary importance though when the introduced gas is inert, it provides an inert atmosphere within chamber 69 thus avoiding the possibility of undue oxidation of the transmission parts.

Thus, in the novel arrangement there is provided in effect a single plane of adjustment through the gear train in which central and intermediate gears may orient themselves into proper running condition. Again referring to FIGURE 3, the disclosed arrangement is particularly meritorious when the driver shaft is journaled at both sides of the central gear. This structure is basically rigid and rather essential for high speed rotation but on the other hand also embodies sufficient flexibility to accommodate misalignment.

By providing the spline shaft 22 with an intermediary member 33, and being both axially and radially movable therewith, the effect achieved is that of having a single universal joint. In contrast to the latter however there are omitted many of the usual wear disadvantages inherent in universals in high speed operation.

It will be readily appreciated by one skilled in the art that a flexible coupling of the type described embodies many features heretofore lacking in a single transmission unit. Primarily, the arrangement of gears permits a close in line coupling counter of rotating shafts. Secondly, wear and excessive vibration are reduced due to the compactness of the unit. Thirdly, the novel coupling lends itself readily to inclusion in a motor compressor unit in which thermal expansion and contraction will be automatically compensated for.

Positive lubrication of the coupling is of prime importance in view of the normal high speed operation. Lubricant is force fed from pumping means not presently shown, and directed through passages 75, 76 and 77 respectively to the forward face of bearing 20. Passage 78 circulates lubricant inwardly through radial passage formed on the bearing rear face. Axial passage 79 communicated with said rear face directs lubricant to the shaft splined points 22'.

A plurality of radial passages 81 are disposed in shaft 22 such that at least one passage feeds each tooth of the splined surface. Connecting passages 82 and 83 disposed outwardly of passage 81 receive lubricant by centrifugal force to lubricate the meshing interface of gear 33 and the respective intermediate gears.

Lubricant carried by the stars is deposited on teeth of annular gear 54. Said gear surface is further lubricated by catching oil being slung outward from the rotating intermediate gears. As previously mentioned, lubricant accumulated in the casing 70 is drained, separated and recirculated.

While the novel coupling has been described specifically as the power transmission member between a motor and a centrifugal compressor, this does not constitute a limitation to the utility of the device. For example, the coupling is adapted to function as the connecting member between other forms of prime movers such as a turbine or internal combustion engine. Further, the drive element may be subjected to either stepped-up or stepped-down rotation in accordance with prime mover rotational speed. Notably, the coupling will function equally as well driving a slow speed pump or a high speed centrifugal compressor.

It is also understood that the presently disclosed coupling represents a preferred embodiment of the invention and that certain modifications and changes may be made without departing from the spirit and scope of the invention.

What is claimed is:
1. In an apparatus of the type described for supplying a compressed fluid, and including; a prime mover having a casing, a high speed shaft rotatably supported within the casing and extending therefrom, a compressor supplying a hot compressed fluid, said compressor including a driven shaft being normally disposed substantially axially of and spaced adjacent to said high speed shaft;

A transmission means connecting said high speed and driven shafts respectively for transmitting torque therebetween and including,
   (a) a hub positioned in said prime mover casing surrounding the high speed shaft,
   (b) a plurality of intermediate gears rotatably journaled in said hub and spaced equidistant from the high speed shaft,
   (c) a ring gear disposed in meshed engagement with the respective intermediate gears and being connected to said driven shaft for rotation therewith,
   (d) a central gear disposed in meshed engagement with the respective intermediate gears and being supported thereby,
   (e) said central gear being non-rigidly connected to said high speed shaft to continuously transmit torque therebetween regardless of non-concentric relationship between the respective central gear and driven shaft during rotatable operation thereof,
   (f) said hub includes means forming a central opening,
   (g) a thrust bearing supported by the hub,
   (h) said high speed shaft being registered in the means forming a central opening and positioned in abutment with the thrust bearing.

2. In an apparatus as defined in claim 1 wherein:
   (a) said high speed shaft includes an engaging surface spaced inwardly adjacent to the respective intermediate gears,
   (b) means forming a plurality of substantially parallel grooves on said engaging surface and extending longitudinally of said high speed shaft,
   (c) said central gear having means forming a central bore and being longitudinally slidably received on the high speed shaft engaging surface for rotation therewith.

3. In an apparatus as defined in claim 2 wherein:
   (a) said high speed shaft engaging surface includes means forming a spline portion thereon,
   (b) said means on central gear forming a central bore being adapted to horizontally engage said high speed shaft spline portion and being non-rigidly received thereon permitting limited eccentric and axial movement of said respective central gear and high speed shaft during rotation thereof.

4. In an apparatus as defined in claim 3 wherein:
   (a) said high speed shaft engaging surface includes an outwardly extending peripheral shoulder formed thereon and disposed inwardly adjacent the respective intermediate gears,
   (b) said means forming a plurality of substantially parallel grooves being formed on said peripheral shoulder.

5. In an apparatus as defined in claim 4 wherein:
said central gear includes retaining means extending inwardly thereof for engaging said raised peripheral shoulder to limit horizontal movement of said central gear with respect to said high speed shaft.

6. In an apparatus as defined in claim 5 wherein said retaining means includes at least one removable ring member carried in said means forming a central gear central bore and positioned to engage said high speed shaft.

7. In an apparatus as defined in claim 5 wherein said retaining means includes a pair of retaining rings carried in the means forming the central gear central bore, said rings extending inwardly to engage the peripheral shoulder and prevent excessive horizontal movement between said central gear and high speed shaft.

References Cited by the Examiner
UNITED STATES PATENTS

| 2,498,295 | 2/50 | Peterson et al. | 74—801 |
| 2,516,077 | 7/50 | Schmitter | 74—410 |
| 2,591,743 | 4/52 | Thompson | 74—411 |
| 2,703,021 | 3/55 | Stoeckicht | 74—411 |
| 2,844,052 | 7/58 | Stoeckicht | 74—411 |
| 2,883,885 | 4/59 | Upton | 74—801 |
| 3,011,365 | 12/61 | Stoeckicht | 74—801 |
| 3,021,731 | 2/62 | Stoeckicht | 74—411 |
| 3,034,369 | 5/62 | Marchand | 74—410 |

FOREIGN PATENTS

| 714,351 | 9/31 | France. |
| 958,710 | 9/49 | France. |
| 298,471 | 5/29 | Great Britain. |
| 259,933 | 8/28 | Italy. |

DON A. WAITE, Primary Examiner.